United States Patent [19]
Lindley et al.

[11] Patent Number: 5,513,993
[45] Date of Patent: May 7, 1996

[54] EDUCATIONAL 911 TRAINING DEVICE

[75] Inventors: Cathy R. Lindley, 330 Old Hunts Bridge, Greenville, S.C. 29611; Gerald R. Boss, Greenville, S.C.

[73] Assignee: Cathy R. Lindley, Greenville, S.C.

[21] Appl. No.: 297,018

[22] Filed: Aug. 29, 1994

[51] Int. Cl.$^6$ ....................................................... G09B 5/06
[52] U.S. Cl. ........................ 434/319; 434/317; 434/308; 434/320; 434/322; 446/141; 446/142
[58] Field of Search .................................. 434/308, 317, 434/319, 320, 321, 322; 446/141, 142; 364/419.01, 410

[56] References Cited

U.S. PATENT DOCUMENTS

| | | | |
|---|---|---|---|
| 3,769,744 | 11/1973 | Sloane, Jr. | |
| 5,184,971 | 2/1993 | Williams | 446/142 |
| 5,380,205 | 1/1995 | Bradley et al. | 434/236 |
| 5,382,188 | 1/1995 | Tomellini | 446/142 X |
| 5,419,705 | 5/1995 | Sanduik | 434/317 |

*Primary Examiner*—Richard J. Apley
*Assistant Examiner*—Glenn E. Richman
*Attorney, Agent, or Firm*—Cort Flint

[57] ABSTRACT

An educational training device in disclosed which includes a replica of a telephone including a telephone headset having an operational speaker and a telephone keypad having a plurality of numeric key buttons. A machine is associated with a telephone operatively connected to the speaker and a machine readable medium which embodies an 911 emergency program is provided. The 911 program contains a series of questions relating to a predetermined 911 emergency situation to be asked to a child or other person being trained by the device. A voice converter or synthesizer is operatively connected to the machine and receiver for converting the machine readable program into a voice output through the handset speaker so that the voice of a 911 operator is realistically reproduced to the child listening on the handset. To begin the operation of the machine, an activation input is actuated by the child which is preferably machine instructions which operate to activate the machine in response to the depressing of the 9-1-1 buttons sequentially. A monitor for monitoring and recognizing correct answers from the child in response to the series of questions output through the handset speaker is provided. In one embodiment, the monitor is the guidebook by which a supervisor may monitor the child's responses. In another embodiment, the machine is a computer machine incorporating a voice recognition unit which compares the responses of the child to programmed and input responses stored in a computer readable memory.

31 Claims, 6 Drawing Sheets

Fig. 2

911 PROGRAM

Q1. "911 Operator. May I help you?"
(10 seconds for child to respond)

Q2. "What is your name?"
(10 seconds for child to respond)

Q3. "What is your address?"
(30 seconds for child to respond)

Q4. "What is your phone number?"
(20 seconds for child to respond)

Q5. "Does someone need help at your house?"
(10 seconds for child to respond)

Q6. "Can you tell me how they are hurt?"
(20 seconds for child to respond)

Q7. "Where is the person who needs help?"
(20 seconds for child to respond)

Q8. "Which room are they in?"
(20 seconds for child to respond)

Q9. "I'm sending people to your house to help. Can you open the door and let them inside when they get there?"
(5 seconds for child to respond)

Q10. "That's very good. I'm proud of you. How old are you?"
(10 seconds for child to respond)

Q11. "What is your favorite color?"
(5 seconds for child to respond)

Q12. "That's my favorite color, too. Do you have a pet?"
(10 seconds for child to respond)

Q13. "What is your favorite toy?"
(15 seconds for child to respond)

Q14. "The people who will help you are outside your home now. Will you go and open the door for them?"
(5 seconds for child to respond)

Q15. "Please go and open the door now."

Fig. 3.

GUIDEBOOK

Q1. "911 Operator, may I help you?" There will be a 10 second interval before the next question.
    Sample response could be: "My Mommy is hurt."

Q2. "What is your name?" There will be a 10 second interval before next question.
    Child should say his/her name. If response is incorrect, please press repeat button and the question will be repeated.

Q3. "What is your address?" There will be a 30 second interval before the next question.
    Child should say his/her address. If response is incorrect, please press the repeat button.

Q4. "What is your phone number?" There will be a 20 second interval before the next question.
    Child should say his/her phone number. If the response is incorrect, please press the repeat button.

Q5. "Does someone need help at your house?" There will be a 10 second interval before the next question.
    Sample response could be: "Yes. My mommy is hurt."

Q6. "Can you tell me how they are hurt?" There will be a 20 second interval before the next question.
    Sample response could be: "Mommy fell and now she is sleeping. She will not talk to me."

Q7. "Where is the person who needs help?" There will be a 20 second interval before the next question.
    Sample response could be: "Mommy is on the floor."

Q8. "Which room are they in?" There will be a 20 second interval before the next question.
    Sample response could be: "She's in the kitchen."

Q9. "I'm sending people to your house to help. Can you open the door and let them inside when they get there?" There will be a 5 second interval before the next question.
    Correct response would be "Yes." Child should be instructed on how to unlock and open entry door.

Q10. "That's very good. I'm proud of you. How old are you?" There will be a 10 second interval before next question.
    Child should respond with his/her age.

Q11. "What is your favorite color?" There will be a 5 second interval before the next question.
    Child should respond with any color.

Q12. "That's my favorite color, too. Do you have a pet" There will be a 10 second interval before the next question.
    Child should respond either "Yes" or "No".

Q13. "What is your favorite toy?" There will be a 15 second interval before the next question.
    Child should respond with any toy.

Q14. "The people who will help you are outside your home now. Will you go and open the door for them?" There will be a 5 second interval before the last instruction.
    Child should respond "Yes".

Q15. "Please go and open the door now."

EDUCATIONAL 911 TRAINING DEVICE

BACKGROUND OF THE INVENTION

This invention relates to an education training device for training a young child to respond to an emergency situation, and more particularly to teaching a young child to respond to an emergency in the home using 911 emergency procedures.

The invention relates to an educational training device for training a young child to respond to a medical emergency using 911 medical emergency procedures.

Previously, it has been known to provide toy telephones which function for players for phonograph records, such as shown in U.S. Pat. No. 3,769,744 wherein music is played through the handset. However, the device is purely for amusement, and lacks any real educational or training value. It is also know to provide educational toys having simulated typewriter keys wherein spelling of words is input through the keyboard in response to audible programmed questions.

With the increased number of emergencies occurring in the home, the problem of adequate instruction for children in order that they may properly handle an emergency situation using 911 medical procedures is becoming a problem to which considerable care need be given.

Accordingly, an object of the invention is to provide an educational and training device for training a young child to respond to a medical emergency using 911 emergency procedures.

Another object of the present invention is to provide a 911 medical emergency training device for use with young children which realistically simulates a telephone call to 911 medical personnel.

SUMMARY OF THE INVENTION

The above objectives are accomplished according to the invention by providing an educational training device for teaching children how to respond to 911 emergency procedure using a telephone. The invention comprises a telephone housing replicating an operable telephone and includes a cradle which receives a telephone handset and a keypad which has a plurality of depressible numeric key buttons. A telephone handset is carried by the telephone cradle and has at least an operable speaker. A machine associated with the telephone housing is operatively connected to the speaker. A machine readable medium is used which embodies a program containing a series of questions to be asked to the child by a voice simulating a 911 operator. A voice converter is operatively connected to the machine and the receiver for converting the questions contained in the program into human speech so that the machine generates a voice output which can express the questions through the handset speaker. An activation input is actuated by the child for activating the machine to generate the voice output through the speaker held by the child in a realistic manner for soliciting answers from the child in response to the questions. The activation input may be provided by the actuation of the numeric key buttons corresponding to the numbers 9-1-1 sequentially. A monitor monitors and recognizes correct answers from the child in response to the questions output through the handset speaker. The monitor may include a written guidebook containing the questions so that a supervisor may monitor the child's responses. A repeat input button is operatively connected to the machine for actuation by the supervisor when the child has responded improperly to cause the machine to repeat the previous question.

Preferably, the machine includes a computer machine which uses a computer readable medium. The program includes computer readable code means which embodies the questions, and causes the computer to generate a voice output of questions. The computer readable code means includes instructions for causing the computer to generate the activation input in response to the actuation of the numeric key buttons corresponding to the numbers 9-1-1 sequentially. The computer executes the computer readable code means in a manner causing the computer to generate the voice output of the questions and generate a prescribed time pause between successive ones of the questions. A computer readable code means includes instructions which cause the computer to repeat a previous question in response to a repeat input being actuated. The voice converter includes a voice synthesizer that converts the computer readable code means into simulated speech which is contained in the voice output.

A monitor may alternately be provided, in the case of a computer, by a voice recognition unit which recognizes words spoken by the child into the handset transmitter, and compares the words with programmed responses stored in the computer readable memory. The computer readable memory contains a series of proper responses to the series of questions. The response data includes input response data which has been input as computer readable code into the computer readable medium by the user. The input response data contains response information specific to the user which may be a response to a programmed question.

Alternately, the machine readable medium may include a standard cassette tape, and the voice converter may include a cassette tape player; or the machine readable medium may include a standard compact disc, and the voice converter may include a compact disc player.

In accordance with the invention, a method is provided for training a young child to respond to a 911 emergency. A machine associated with a telephone replica operatively connected to a receiver is provided.

A program is provided which contains a series of questions to be asked to the child simulating a 911 emergency embodied in a machine readable medium which is readable by the machine. The method includes actuating an input for activating the machine to read the program, and converting the program into a voice output as read by the machine in a manner that the series of questions are audibly reproduced through the speaker held by the child. The voice is transmitted to the child in a realistic manner to a voice of a 911 operator for soliciting answers from the child in response to the questions. Next, the method includes monitoring the child's answers for correctness in response to the questions in the voice output through the handset receiver. The method of monitoring includes providing a written guidebook containing the questions so that a competent person may monitor the child's responses. The method includes repeating the previous question when the child has responded improperly. The method includes activating the machine in response to the actuation of the numeric key buttons corresponding to the numbers 9-1-1 sequentially.

Preferably, the machine includes a computer which has a machine readable medium and includes a computer readable medium. The program includes computer readable code which embodies the questions. The method further comprises converting the computer readable code into questions in the form of human speech using a voice synthesizer controlled by the computer. The computer readable code is executed by the computer in a manner which causes the computer to generate the audible output of the questions and generate a prescribed time pause between successive ones of the questions. The method includes repeating a previous question in response to the monitoring of an improper response by the child. The responses are monitored by using a voice recognition unit which recognizes a response spoken by the child into a handset transmitter, and then compares the spoken response to response data stored in the computer readable medium.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is an illustration of a guidebook according to the invention for use by a supervisor in training a child on the training device of the present invention;

DESCRIPTION OF A PREFERRED EMBODIMENT

Figure 1:
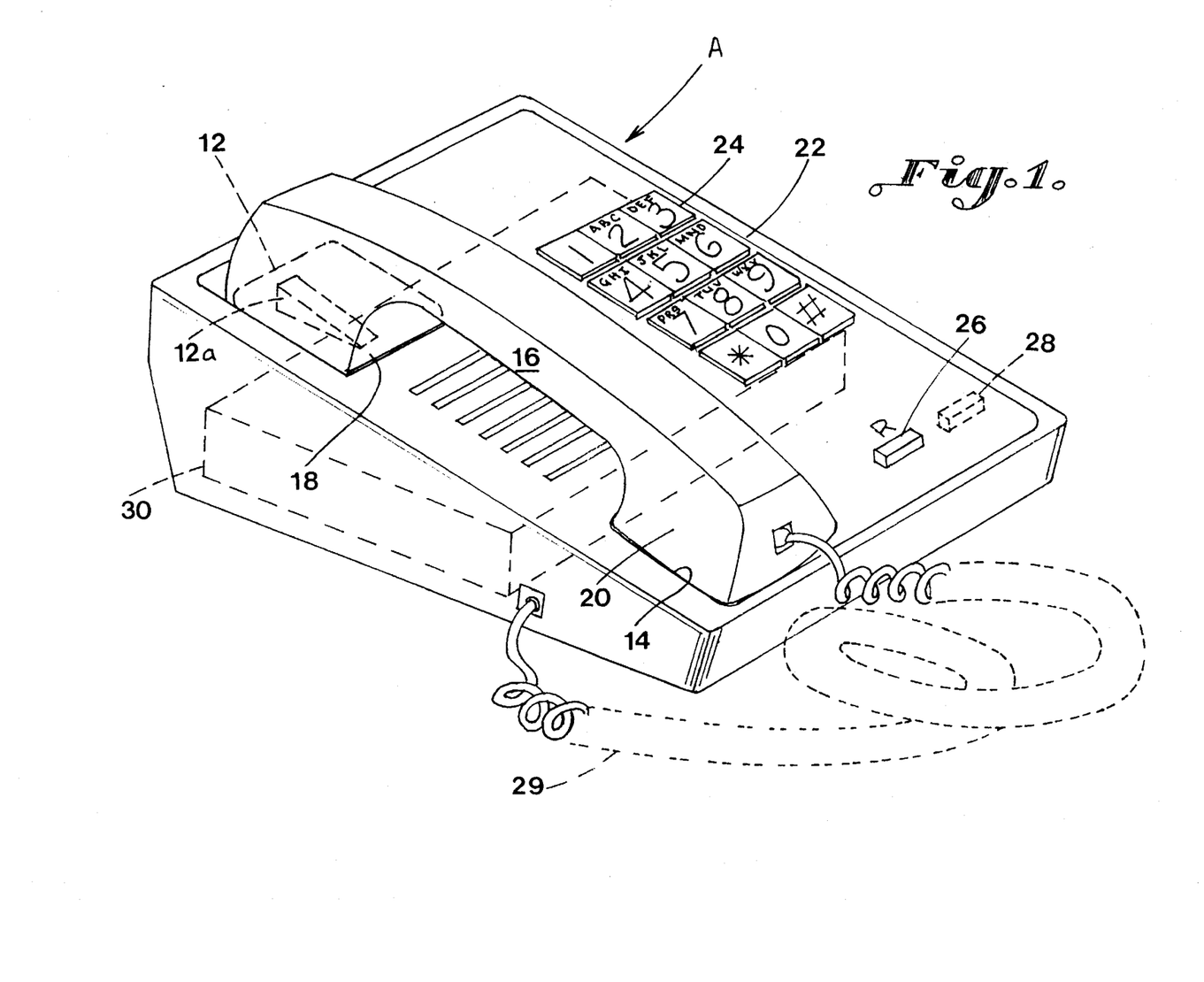
FIG. 1 is a perspective view of an educational device for training a young child to respond to a 911 medical emergency according to the invention.

Referring now in more detail to the drawings, an educational training device, designated generally as 8 is illustrated wherein a housing 10 is provided which is a replica of a typical telephone housing which includes a cradle 12, 14 for receiving a telephone handset 16 having a handset speaker 18 and a handset transmitter 20 which may or may not be operative depending on the embodiment of the invention being applied. Handset speaker 18 is operative in a preferred embodiment of the invention, although an external speaker as in a speaker phone may also be utilized. A keypad, illustrated generally as 22, is carried by the housing which includes a plurality of alpha/numeric key buttons 24 which are a replica of a typical telephone keypad set consisting of twelve key buttons 24 which are a replica of a typical telephone key pad set. Two non-conventional input buttons are also provided on the housing which include a repeat input button 26 and a rewind button 28 which may be utilized in certain embodiments of the invention.

Figure 2:
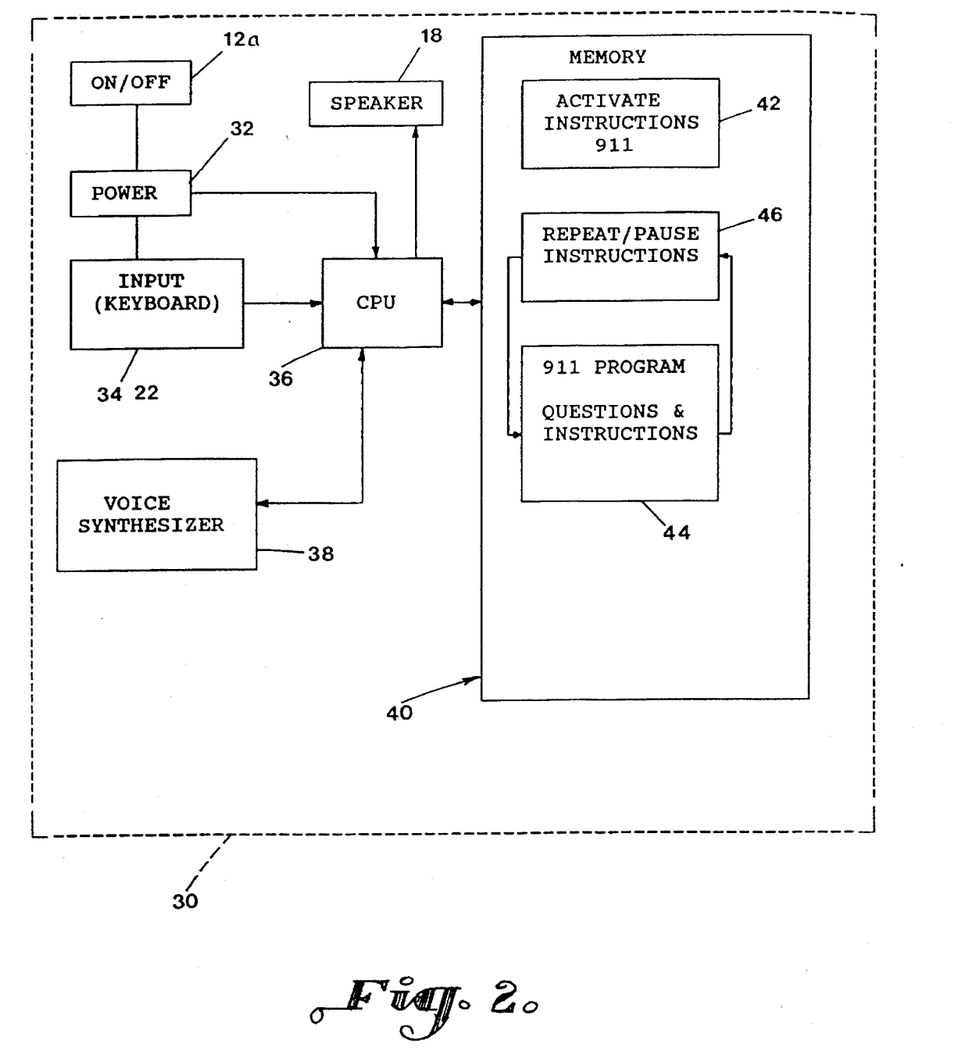
FIG. 2 is a block diagram illustrating a computer machine which operates the device of FIG. 1 for training a young child to respond to 911 medical emergency procedures.
Figure 3:
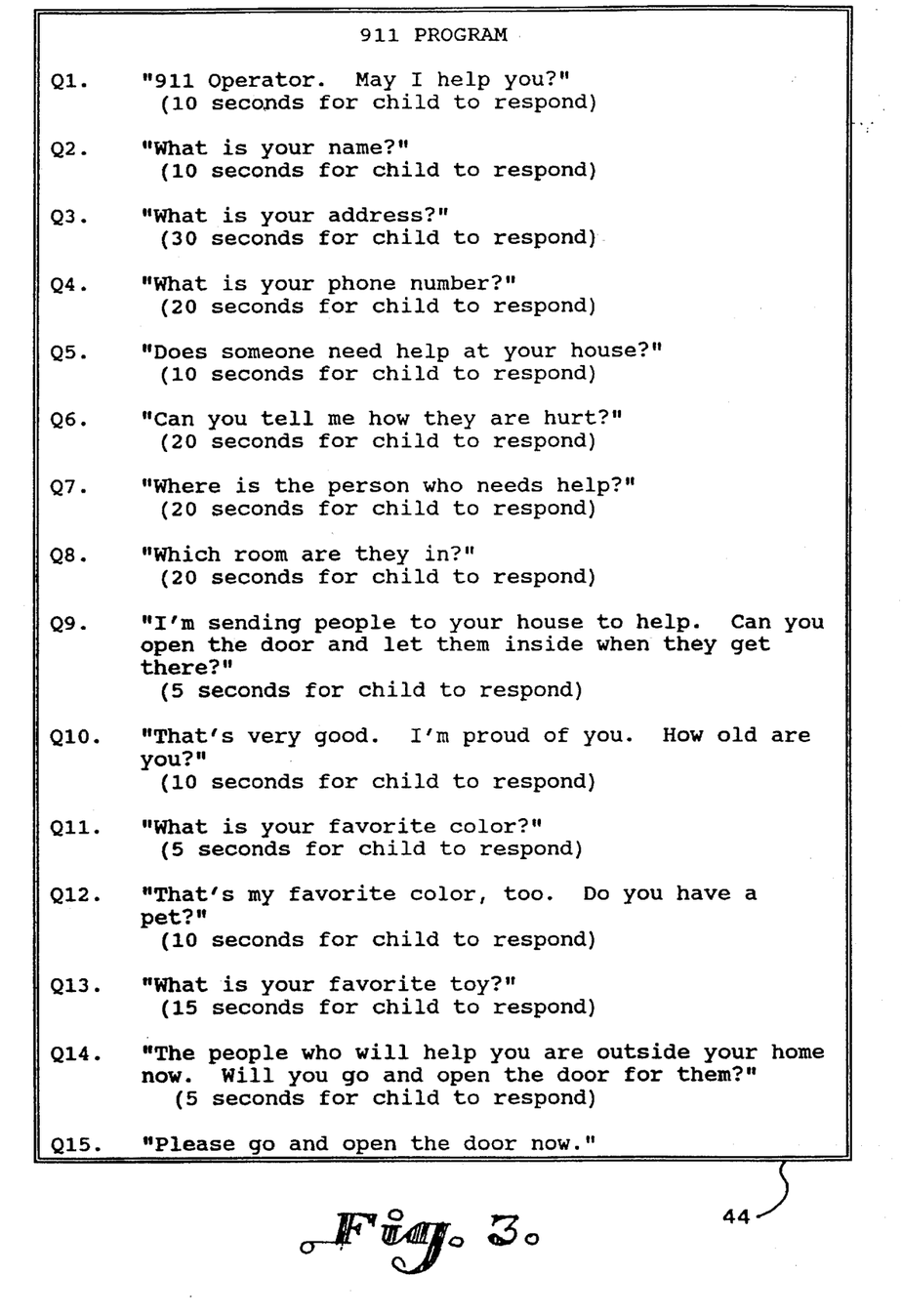
FIG. 3 is a block diagram illustrating a program for a computer machine which may be embodied in a computer readable medium for causing a computer to operate the educational device of FIG. 1.

A machine, designated schematically as 30 is enclosed within housing 10. In a preferred embodiment of the invention, machine 30 includes a computer machine having the elements illustrated in block diagram form in FIG. 2. There is an on/off button for actuating the computer machine which advantageously is provided in the form of the call/hang-up button 12a carried in cradle 12 of housing 10. Power may be provided by a suitable power supply 32 connected to an external power source, or provided by a battery power source carried in the housing. Next, an input 34 is provided which corresponds to the keypad 22 of the telephone replica. Next, there is a standard central processing unit 36 which may be any standard central processing chip. There is a speaker connected to the processing unit via cord 29 which, as noted above, is preferably the handset speaker 18. Use of the handset speaker is preferred because it more realistically will train the child to respond to 911 emergencies using a telephone call. A voice synthesizer 38 is connected to the central processing unit which may be any conventional voice synthesizer which simulates speech under the digital control of the processor unit, as will be more fully described hereinafter. A machine readable medium is provided in the form of a computer readable memory designated generally as 40. Embodied in the computer readable memory is activating instructions 42 which activate the training device and computer in response to actuation by the child or other user. In the preferred embodiment, the activation instructions include activation of the computer in response to the 9-1-1 buttons being sequentially depressed as in the case of an actual 911 emergency call. Upon sensing the actuation of the key buttons, the instructions and computer readable code are acted upon by the processing unit. A 911 program 44 (FIG. 3) includes a series of questions and instructions which can audibly be reproduced from a medium storing 911 program 44. In the preferred embodiment, 911 program 44 is written in computer readable code embodied in computer useable medium 40. The questions and instructions are outputted through voice synthesizer 38 in response to the machine being activated. As an example of a 911 program, FIG. 3 illustrates a series of questions and time pause instructions. The 911 program is executed by the computer so that the series of questions are output in the form of human speech through the voice synthesizer with the pauses indicated between each question. Repeat/pause instructions 46 are embodied in the computer usable memory 40 in the form of computer readable code which instruct the processor to repeat a previous question in response to repeat input button 26 being depressed and released. In the event that repeat input button 26 is depressed and held, the execution of the 911 program will be suspended until the button is released.

A monitor for monitoring and recognizing that the child has given correct answers to the series of questions may be provided by a written guidebook 48. A supervisor which may be a parent or other competent person to supervise the responses of the child would use the guide book to monitor the child's responses. In the event the child gives an improper response to any of the questions, the supervisor will depress the repeat button and have the child listen to the question again, and answer the have the child answer the question again. This is repeated until the child has answered the question correctly. After the correct answer is given, the repeat button is not depressed, and the series of questions continues. After the entire series of questions is outputted, the computer will reset the system until 911 is again dialed.

As can best be seen in FIG. 4, an example of a guidebook 48 is illustrated to assist an adult or other supervisor using the 911 training device. The recommended responses are not the only ones appropriate to any given medical emergency and are provided as example purposes only. Adults training young children with this device will tailor the responses to the personality and age of their child. Before actual training begins, adults should explain to the child that this is a game to help them learn to call for help if it is necessary, and to use the real telephone if an emergency happens.

Questions 10 through 13 are designed to keep the child on the phone while emergency personnel are in route to the home. Operators will typically ask young children similar types of questions to maintain contact and to help the child remain calm. In an actual emergency situation, different or additional questions may be asked by the 911 Operator. Questions 10 through 13 are given as an aid to allow the child to become familiar with questions that are not related to the emergency at hand. That is all of the questions asked on the 911 program. In an actual emergency, personnel responding to the call will take charge of the situation and your child.

The program is activated by lifting the telephone receiver releasing the "ON" button 12a which may advantageously correspond to the call/hang up button typically found in the cradle of a standard telephone, or the "ON" button may be located elsewhere on the telephone. When the child lifts receiver and presses 911, there is a 45 second delay before the program begins. If it is desired to repeat any of the questions during the program, repeat button 26 located on the side of the telephone is depressed, and the last question asked will be repeated.

It is to be understood, or course, that a number of different 911 programs may be provided for training such as accident, health failure, fire, emotional and physical violence, crimes, etc. The different programs may be embodied and selectable on the different mediums.

Figure 5:
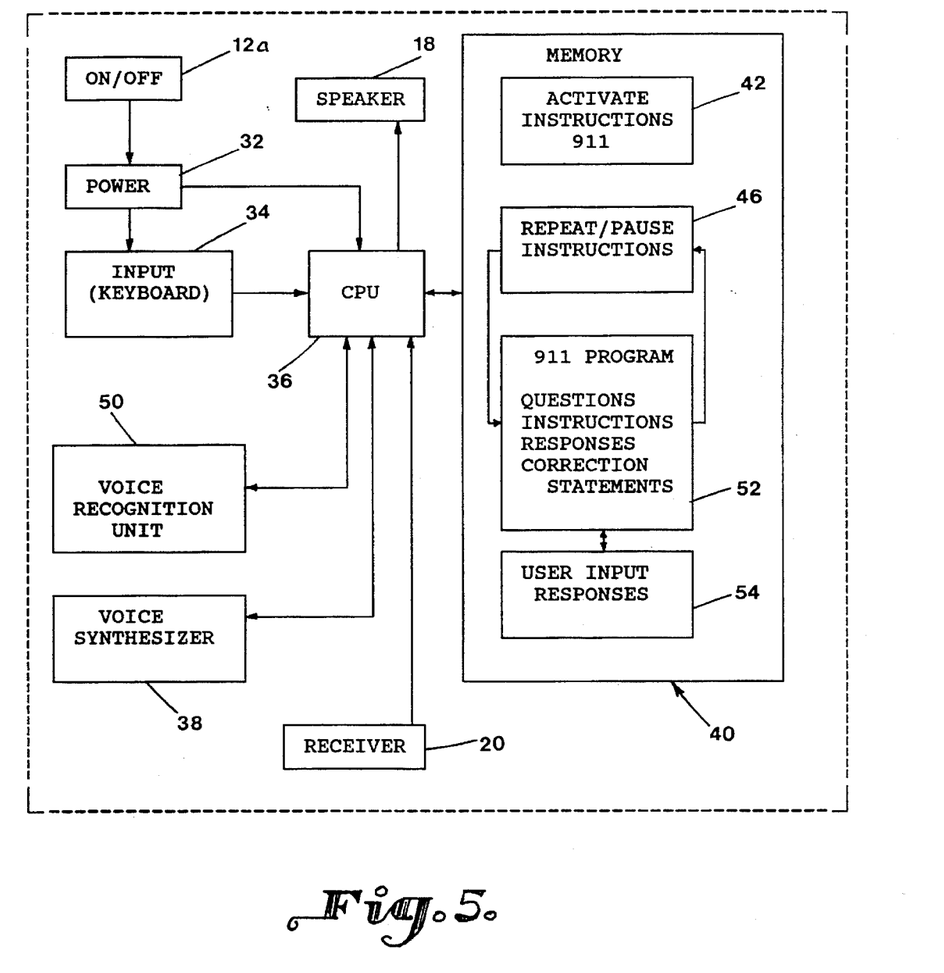
FIG. 5 is a block diagram of an alternate embodiment of the invention for operating the education training device of FIG. 1.

Referring now to FIG. 5, an alternate embodiment of the invention is provided wherein the monitor for monitoring the correct responses by the child is accomplished by using the voice recognition which compares the child's response to programmed responses and user input responses accessible in the machine readable medium. In FIG. 5, the elements that correspond to like elements of FIG. 2 are numbered the same, and the remaining elements will now be described. Voice recognition 50 may include any standard computer peripheral device that recognizes a number of spoken words and converts them into equivalent digital signals which can serve as computer input or initiate other desired actions. In this case, voice recognition system 50 converts the child's responses into digital signals which are input to the processor 36 and are compared with stored responses in computer readable medium 40. For this purpose a 911 program 52 may be provided which embodies questions, instructions, and programmed responses in the form of computer readable code. The questions may include the same questions in the guidebook depicted in FIG. 4 which are also the same questions depicted in the 911 program of FIG. 3. The pause instructions may also be the same. However, in the 911 program 52 of FIG. 5, programmed responses will be included in the form of computer readable code, to, for example questions Q1 and Q5 through Q8. The child will be taught the programmed responses as part of the training technique. In addition to the programmed responses contained in the 911 program, there will also be user input responses 54 stored in memory. These responses are user specific and are input by the child or user being trained on the device. For example, in the 911 program contained in FIG. 4, questions Q2 through Q4 will be input by the user. This may be accomplished by using a setup function of the voice recognition and inputting the input responses into a database 54 accessible by the 911 program and computer 36. By placing the voice recognition 50 in a standard set up mode, handset transmitter 20 is operational and are connected to the computer so that the responses may be input directly by the user. The input responses may also be input to the computer usable medium in the form of computer readable code by using the alpha-numeric telephone key buttons. For example, the responses to questions Q2 through Q4 will be user specific and will be input by the parent or other supervisor using the key alpha-numeric key buttons. For this purpose, a switch (not shown) may be provided to switch the key buttons to a alphabet mode where the first letter is input by one stoke of a button, the second letter is input by two strokes, and the third letter is input by three strokes of the button. It will be also understood, of course, that a wide variety of 911 emergency situations may be programmed in the form of computer readable code and stored in the memory. The emergency situations may be selectable by inputting a program number using the numeric key buttons. For example, if there are twenty emergency situation programs, the child may push any key button or combination of key buttons to select program one, program two, etc. The guidebook will contain the questions and responses so that the programmed responses can be learned by the child for a wide variety of emergency situations such as accidents, fire, physical violence, etc.

In operation, when 9-1-1 is dialed by pushing the key buttons, an executable program in the computer memory instructs the processor to access the 911 program. The first question Q1 is read by the computer and output through the voice synthesizer so that the question "911 Operator, may I help you?" is received by the child through the handset speaker or receiver. The child's response is transmitted by the handset transmitter to the voice recognition unit 50 and compared to the response stored for question Q1. If correct, question Q2 is then read, converted, and transmitted through speaker 18. The computer will then proceed through the remainder of the 911 program. If the response is not correct, the computer readable code causes the computer to activate the voice synthesizer and generate a correction statement and repeat the question. The correction statements are also contained in the 911 program 52. For example, if the child gives the incorrect house number, the voice over the handset speaker will tell the response is not correct, and repeat the question. For example, in Q3, the child may be instructed that the address is wrong and asked the question again, or the child may be told to ask their parent(s) what the address is. The correction statement program my simply tell the child that the response is incorrect, and repeat the question. If another incorrect response is made by the child, another correction statement will be output. If the child's response is incorrect a third time, the correction statement may instruct the child to ask the supervisor or parent the question. While the preferred embodiment of the invention is to have a supervisory person with the child to monitor the questions, as in the other embodiments, there may be some instances when it is desirable for the child to practice by himself, e.g. name, telephone number, and address. In this case, the embodiment of FIG. 5 may be used. However, since the 911 operator in a real emergency will not know whether these responses are correct, this does not provide a realistic simulation of the actual telephone conversation as when a supervisor and guidebook are used without telephone recognition and feedback.

Figure 6:
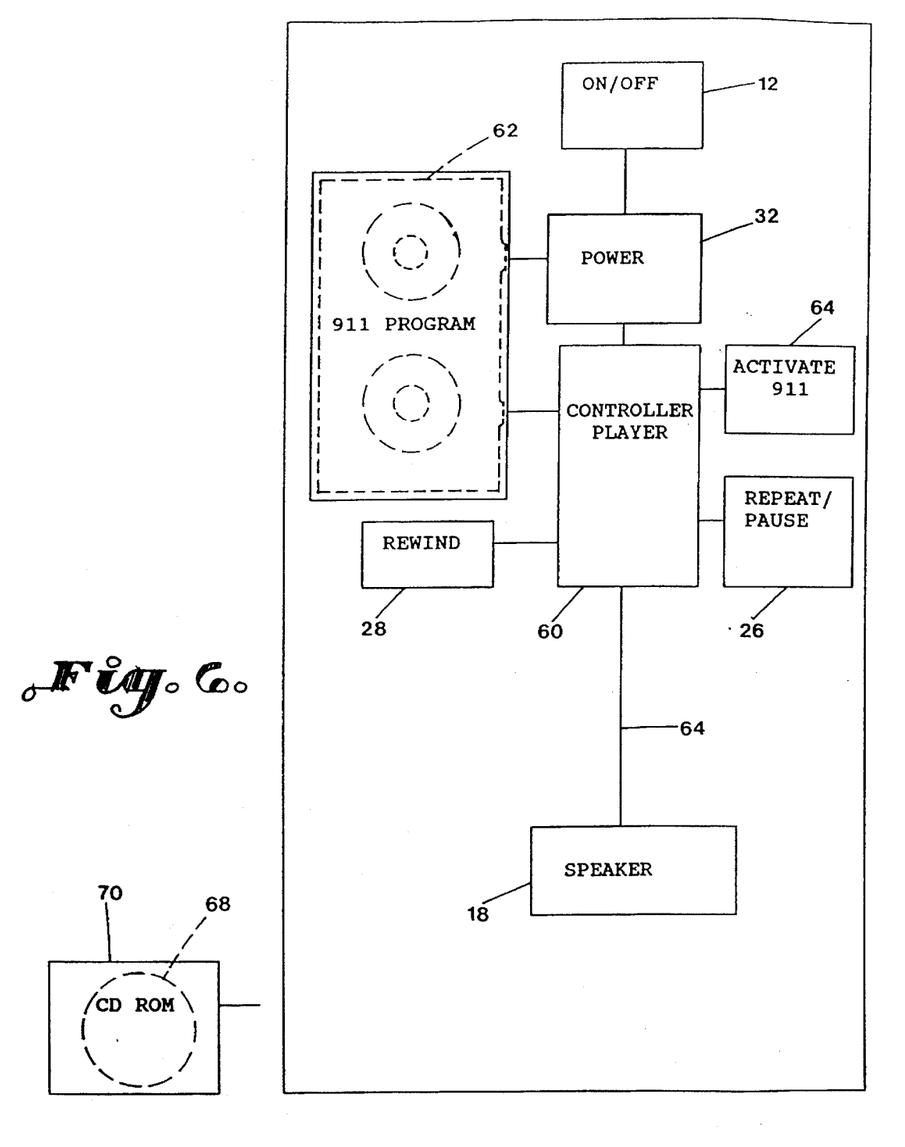
FIG. 6 is a block diagram of an alternate embodiment of a machine embodied in the education training device of FIG. 1 according to the invention.

Referring now to FIG. 6, another embodiment of the invention will be described. In this embodiment, the like elements are numbered as in FIGS. 2 and 5. In this embodiment, the machine includes a cassette tape player 60 and the machine readable medium in which the 911 program consisting of a series of questions and instructions is stored includes a standard cassette tape 62. In this case, the activation input includes a switch 64 which responds to the sequential actuation of the key buttons 9-1-1 to activate the player and audibly transmit the questions and instructions stored on standard cassette tape 62. In this case, an audio output 64 is provided by the cassette player that is produced over the handset speaker 18. In this embodiment rewind button 28 is utilized to reset the training device by rewinding cassette tape 62 after completion of the program. Repeat button 26 works the same as in the embodiment of FIG. 2 wherein if an improper response is give by the child, the repeat button is depressed and released to repeat the question. In the embodiment of FIG. 6, the monitor for monitoring the responses of the child to determine if the response is correct again is guidebook 52. The questions and time pauses of the 911 program in FIG. 3 will be embodied on the magnetic tape of cassette 62. In an alternate embodiment of FIG. 6, the 911 program may be embodied on a compact disc 68 and may be played through a conventional CD player 70 which is substituted for the cassette tape 62 and cassette tape player 60 shown in FIG. 60. The compact disc is operated in the same manner as described above for the cassette tape and player.

While a preferred embodiment of the invention has been described using specific terms, such description is for illustrative purposes only, and it is to be understood that changes and variations may be made without departing from the spirit or scope of the following claims.

What is claimed is:

1. An educational training device for teaching children how to respond to 911 emergency procedure using a telephone comprising:
   a telephone housing replicating an operable telephone including a cradle for receiving a telephone handset and a keypad having a plurality of depressible numeric key buttons;
   a telephone handset carried by said telephone cradle having at least an operable speaker;
   a computer carried within said telephone housing;
   a computer readable medium which embodies a program in the form of computer readable program code means containing a series of questions to be asked to said child by a voice simulating a 911 operator;
   a voice synthesizer operatively connected to said computer and said receiver for converting said program code means into human speech so that said computer generates a voice output which expresses said questions through said handset speaker;
   an activation input actuated by said child for activating said computer to generate said voice output to audibly produce said questions through said speaker held by said child in a realistic voice simulating said 911 operator for soliciting answers from said child in response to said questions, and a monitor for monitoring and recognizing correct answers from said child in response to said questions output through said handset receiver.

2. The device of claim 1 wherein said monitor includes a written guidebook containing said questions so that a supervisor may monitor said child's responses.

3. The device of claim 2 including a repeat input button operatively connected to said controller for actuation by said supervisor when said child has responded improperly to cause said computer to repeat the previous question when said repeat input button is actuated.

4. The device of claim 1 wherein said plurality of numeric key buttons replicate the key buttons of a typical telephone, and wherein said computer readable code means includes instructions for causing said computer to generate said activation input in response to the actuation of said numeric key buttons corresponding to the numbers 9-1-1 sequentially.

5. The device of claim 1 wherein said computer readable code means causes said computer to activate said voice synthesize to output said questions in the form of human speech through said speaker and generate a prescribed time pause between successive ones of said questions.

6. The device of claim 5 wherein said computer readable code means causes said computer to repeat a previous question in response to a repeat input being actuated.

7. An educational training device for teaching children how to respond to 911 emergency procedure using a telephone comprising:
   a telephone housing replicating an operable telephone including a cradle for receiving a telephone handset;
   a telephone handset carried by said telephone cradle having at least an operable speaker;
   a machine associated with said telephone housing operatively connected to said speaker;
   a machine readable medium which embodies a program containing a series of questions to be asked to said child by a voice simulating a 911 operator;
   a voice converter operatively connected to said machine and said receiver for converting said program into human speech so that said machine generates a voice output which expresses said questions through said handset speaker;
   an activation input actuated by said child for activating said machine to generate said voice output through said speaker held by said child in a realistic manner for soliciting answers from said child in response to said questions; and
   a monitor for monitoring and recognizing correct answers from said child in response to said questions output through said handset speaker.

8. The device of claim 7 wherein said monitor includes a written guidebook containing said questions so that a supervisor may monitor said child's responses.

9. The device of claim 8 including a repeat input button operatively connected to said machine for actuation by said supervisor when said child has responded improperly to cause said machine to repeat the previous question.

10. The device of claim 7 including a key pad having a plurality of numeric key buttons replicating the key buttons of a typical telephone, and wherein said activation input is generated in response to the actuation of said numeric key buttons corresponding to the numbers 9-1-1 sequentially.

11. The device of claim 7 wherein said machine includes a computer, said machine readable medium includes a computer readable medium, and said program includes computer readable code means which embodies said questions, and causes said computer to generate a voice output of questions.

12. The device of claim 11 including a plurality of depressible numeric key buttons which replicate key buttons of a typical telephone, and wherein said computer readable code means includes instructions for causing said computer to generate said activation input in response to the actuation of said numeric key buttons corresponding to the numbers 9-1-1 sequentially.

13. The device of claim 11 wherein said computer readable code means is executable by said computer in a manner causing said computer to generate said voice output of said questions and generate a prescribed time pause between successive ones of said questions.

14. The device of claim 13 wherein said computer readable code means button causes said computer to repeat a previous question in response to a repeat input being actuated.

15. The device of said claim 11 wherein said voice converter includes a voice synthesizer that converts said computer readable code means into simulated speech which is contained in said voice output.

16. The device of claim 15 wherein said monitor includes a voice recognition unit which recognizes words spoken by said child into said handset transmitter, and compares the words with programmed response data stored in said computer readable memory containing a series of proper responses to said series of questions.

17. The device of claim 16 wherein said response data includes input response data which has been input as computer readable code into said computer readable medium by the user, said input response data containing response information specific to the user which may be a response to a programmed question.

18. The device of claim 7 wherein said machine readable medium includes a standard cassette tape, and said voice converter includes a cassette tape player.

19. The device of claim 7 wherein said machine readable medium includes a standard compact disc, and said voice converter includes a compact disc player.

20. The device of claim 7 including a repeat input button causing said machine to repeat a previous question in response to being actuated.

21. A method for training a young child to respond to a 911 emergency comprising the steps of:

providing a telephone housing replicating an operable telephone including a cradle for receiving a telephone handset, a keypad having a plurality of depressible numeric key buttons, a telephone handset carried by said telephone cradle having at least an operable receiver, and a machine associated with said telephone housing operatively connected to said receiver;

providing a program containing a series of questions to be asked to said child and simulating a 911 emergency embodied in a machine readable medium which is readable by said machine;

actuating an input for activating said machine to read said program;

converting said program into a voice output as read by said machine in a manner that said series of questions are audibly reproduced through said receiver held by said child in a realistic manner to a voice of a 911 operator for soliciting answers from said child in response to said questions; and monitoring and recognizing correct answers from said child in response to said questions in said voice output through said handset receiver.

22. The method of claim 21 wherein said monitoring includes providing a written guidebook containing said questions so that a competent person may monitor said child's responses.

23. The method of claim 22 including causing said machine to repeat the previous question when said child has responded improperly.

24. The method of claim 21 including activating said machine in response to the actuation of said numeric key buttons corresponding to the numbers 9-1-1 sequentially.

25. The method of claim 20 wherein said machine includes a computer, said machine readable medium includes a computer readable medium, and said program includes computer readable code which embodies said questions; and wherein said method comprises converting said computer readable code into questions in the form of human speech using a voice synthesizer controlled by said computer.

26. The method of claim 25 including activating said computer in response to the actuation of numeric key buttons corresponding to the numbers 9-1-1 sequentially.

27. The method of claim 25 including executing said computer readable code by said computer in a manner causing said computer to generate said audible output of said questions and generate a prescribed time pause between successive ones of said questions.

28. The method of claim 27 including causing said computer to repeat a previous question in response to the monitoring of an improper response by said child.

29. The method of claim 27 including monitoring said response by using a voice recognition unit which recognizes a response spoken by said child into a handset transmitter, and comparing the spoken response to response data stored in said computer readable medium.

30. The method of claim 21 wherein said machine readable medium includes a standard cassette tape, and said method includes converting program on said tape into a voice output using a cassette tape player.

31. The method of claim 21 wherein said machine readable medium includes a standard compact disc, and said method includes converting said program on said disc using a compact disc player.

* * * * *